(12) United States Patent
Xiao et al.

(10) Patent No.: US 11,784,756 B2
(45) Date of Patent: Oct. 10, 2023

(54) MEMORY ACCESS TECHNOLOGY AND COMPUTER SYSTEM

(71) Applicant: Huawei Technologies Co., Ltd., Shenzhen (CN)

(72) Inventors: Shihai Xiao, Moscow (RU); Florian Longnos, Shenzhen (CN); Feng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 458 days.

(21) Appl. No.: 16/893,748

(22) Filed: Jun. 5, 2020

(65) Prior Publication Data

US 2020/0304238 A1 Sep. 24, 2020

Related U.S. Application Data

(63) Continuation of application No. PCT/CN2017/114997, filed on Dec. 7, 2017.

(51) Int. Cl.
*H04L 1/1607* (2023.01)
*G06F 3/06* (2006.01)

(52) U.S. Cl.
CPC .......... *H04L 1/1642* (2013.01); *G06F 3/0604* (2013.01); *G06F 3/0659* (2013.01); *G06F 3/0673* (2013.01)

(58) Field of Classification Search
CPC ... H04L 1/1642; H04L 1/1874; G06F 3/0604; G06F 3/0659; G06F 3/0673; G06F 3/0656; G06F 3/0679; G06F 3/061
See application file for complete search history.

(56) References Cited

U.S. PATENT DOCUMENTS 8,365,015 B1   1/2013   Yu et al.
9,092,140 B2 * 7/2015   Ciltone ............... G06F 11/1076
(Continued)

FOREIGN PATENT DOCUMENTS

CN   101000590 A   7/2007
CN   101546291 A   9/2009
(Continued)

OTHER PUBLICATIONS

Alouani, I., "AS8-static random access memory (SRAM): asymmetric SRAM architecture for soft error hardening enhancement," IET Circuits, Devices and Systems, 2017, vol. 11, Iss. 1, pp. 89-94.
(Continued)

*Primary Examiner* — Cynthia Britt
*Assistant Examiner* — Rong Tang
(74) *Attorney, Agent, or Firm* — Conley Rose, P.C.

(57) ABSTRACT

A memory access technology and a computer system, where the computer system includes a memory controller and a medium controller connected to the memory controller. In the computer system, when detecting that an error occurs in first data that is returned by the medium controller in response to a first send command, the memory controller determines sequence information of the first send command in a plurality of send commands that have been sent by the memory controller within a time period from a time point at which the first send command is sent to a current time, and sends a data retransmission command to the medium controller to instruct the medium controller to resend the first data based on the sequence information.

18 Claims, 8 Drawing Sheets

(56) References Cited

U.S. PATENT DOCUMENTS

| | | | |
|---|---|---|---|
| 2009/0290247 A1* | 11/2009 | Ito | G06F 11/076 |
| | | | 711/E12.001 |
| 2010/0081469 A1* | 4/2010 | Kazmi | H04W 52/12 |
| | | | 455/522 |
| 2012/0054539 A1 | 3/2012 | Zhang | |
| 2013/0159556 A1* | 6/2013 | Mizumaki | G06F 3/0659 |
| | | | 710/5 |
| 2015/0378808 A1 | 12/2015 | Kumar et al. | |
| 2017/0255383 A1 | 9/2017 | Chang et al. | |
| 2017/0322726 A1* | 11/2017 | Walker | G06F 3/0679 |
| 2018/0059933 A1* | 3/2018 | Helmick | G06F 3/0683 |
| 2018/0219562 A1* | 8/2018 | Lee | H03M 13/098 |

FOREIGN PATENT DOCUMENTS

| | | | |
|---|---|---|---|
| CN | 102385533 A | 3/2012 | |
| CN | 102880529 A | 1/2013 | |
| CN | 106407130 A | 2/2017 | |
| CN | 106462480 A | 2/2017 | |
| CN | 107153616 A | 9/2017 | |
| CN | 107423230 A | 12/2017 | |

OTHER PUBLICATIONS

Luo, L., et al., "Survey on In-Memory Computing Technology," Journal of Software, 2016, 27(8), pp. 2147-2167.

\* cited by examiner

| Send command identifier | Timer | Counter | Valid bit | Data | ECC result |
|---|---|---|---|---|---|
| First send command | T1 | 2 | Valid | Data 0 | Incorrect |
| Second send command | T2 | 1 | Valid | Data 1 | Null |
| Third send command | T3 | 0 | Valid | Null | Null |

| Function (Function) | CS | Rising edge of a clock signal on a command/address bus Command/Address Signal Rising CLK_t | | | | | | | Falling edge of a clock signal on a command/address bus Command/Address Signal Falling CLK_t | | | | | | |
|---|---|---|---|---|---|---|---|---|---|---|---|---|---|---|---|
| | | CA0 | CA1 | CA2 | CA3 | CA4 | CA5 | CA6 | CA0 | CA1 | CA2 | CA3 | CA4 | CA5 | CA6 |
| Send (Send) command 502 | L | H | L | H | H | H | L | RFU | RFU | | | | Mod=000 | | |
| | H | RFU | | | | | | | | | | | | | |
| Data retransmission command (REC) 504 | L | H | L | H | H | H | L | RFU | Rec Pointer [3:0] | | | | RFU/SB [2:0] | | RFU |
| | H | RFU/RID[9:0] | | | | | | | | | | | Mod=001 | | |

FIG. 5A

| Function (Function) | CKE_0 | | CS_n | ACT_n | A16 | A15 | A14 | BG0_BG1 C2_C0 | BA0_BA1 | A17 A12 | A13 | A11 | A8-A10 | A0-A7 |
|---|---|---|---|---|---|---|---|---|---|---|---|---|---|---|
| | prev | cur | | | | | | | | | | | | |
| Send (Send) command 506 | H | H | L | H | H | L | H | RFU | RFU/BA [1:0] | RFU | L | L | RFU | RFU |
| Data retransmission command (REC) 508 | H | H | L | H | H | L | H | RFU | Rec pointer [3:0] | | H | L | RFU | RFU/ RID[7:0] |

FIG. 5B

MEMORY ACCESS TECHNOLOGY AND COMPUTER SYSTEM

CROSS-REFERENCE TO RELATED APPLICATIONS

This application is a continuation of International Patent Application No. PCT/CN2017/114997 filed on Dec. 7, 2017, which is hereby incorporated by reference in its entirety.

TECHNICAL FIELD

This application relates to the field of computer technologies, and in particular, to a memory access technology and a computer system.

BACKGROUND

A non-volatile dual in-line memory module (NVDIMM) is a random-access memory (RAM) of a computer. The NVDIMM may include a plurality of non-volatile memory (NVM) chips. The NVDIMM can still store complete memory data when a system is completely powered off. It may be understood that the NVM chip on the NVDIMM may be a non-volatile RAM (NVRAM). The NVM on the NVDIMM may include a phase change memory (PCM), a resistive RAM (RRAM), a magnetic RAM (MRAM), a spin-transfer torque MRAM (STT-MRAM), and the like. The NVDIMM communicates with a memory controller using an NVDIMM-P Protocol. The NVDIMM-P Protocol is a bus access protocol compatible with a double data rate (DDR) protocol.

When the memory controller reads data from the NVDIMM, a time for returning data read using a read command is not fixed. In other approaches, only after obtaining data and parsing the obtained data, the memory controller can learn which read command is used to read the obtained data. After the data is read, if the memory controller finds that an unrecoverable error occurs in the read data, the memory controller can only re-execute all read commands following a latest read command, using which correct data is read, of the erroneous data. However, in this manner, a relatively large quantity of read commands may need to be re-executed, and because a processing time required for executing a read command is relatively long, this manner may degrade performance of a computer system.

SUMMARY

This application provides a memory access technology and a computer system such that erroneous data can be quickly recovered when an error occurs in read data, thereby improving system performance.

According to a first aspect, this application provides a storage. The storage includes a storage medium, and a medium controller connected to both a memory controller and the storage medium. The storage medium is configured to store data. The medium controller is configured to after receiving a data retransmission command that is sent by the memory controller and that is used to instruct the medium controller to resend first data, determine location information of the first data in a backup buffer based on sequence information included in the data retransmission command. The first data is data that is sent by the medium controller to the memory controller in response to a first send command sent by the memory controller. The sequence information is used to indicate a sequence of the first send command in a plurality of send commands that have been sent by the memory controller within a time period from a time point at which the first send command is sent to a current time. The backup buffer is configured to back up data that has been sent by the medium controller to the memory controller. Then, the medium controller sends, to the memory controller based on the location information, the first data backed up in the backup buffer.

According to the storage provided in this embodiment of this application, because the backup buffer configured to back up the data that has been sent to the memory controller is provided, when receiving the data retransmission command sent by the memory controller when the memory controller finds that an error occurs in the received first data, the medium controller in the storage can determine the location information of the first data in the backup buffer based on the sequence information in the data retransmission command, and then can resend the first data in the backup buffer to the memory controller based on the location information of the first data. In this way, when an error occurs in data, the medium controller does not need to re-read the data from the storage medium, thereby reducing a latency in recovering the erroneous data and improving performance of a computer system.

In a first possible implementation of the first aspect, the medium controller is further configured to copy the first data buffered in the backup buffer to a read buffer based on the location information of the first data, where the read buffer is configured to buffer data to be sent by the medium controller to the memory controller. After receiving a second send command sent by the memory controller, the medium controller sends the first data in the read buffer to the memory controller according to the second send command.

With reference to the first aspect and the first possible implementation of the first aspect, in a second possible implementation, the medium controller is further configured to buffer the first data in the backup buffer when sending the first data to the memory controller according to the first send command.

With reference to the first aspect and the first or the second possible implementation of the first aspect, in a third possible implementation, the backup buffer buffers a plurality of pieces of data that have been sent by the medium controller to the memory controller. The plurality of pieces of data are buffered in the backup buffer by the medium controller according to a plurality of responded send commands respectively. The medium controller is further configured to schedule data in the backup buffer in a sequence of receiving the plurality of send commands and according to a first in, first out (FIFO) rule.

With reference to the first aspect and any one of the possible implementations of the first aspect, in another possible implementation, a capacity of the backup buffer may be determined based on a quantity S of send commands that have been sent by the memory controller within a time period from the time point at which the memory controller sends the first send command to a time point at which the memory controller completes error correction code (ECC) detection on the first data. Further, a minimum value of the capacity of the backup buffer is equal to a size of S data blocks, where S is:

$$S=INT\{(tRL+tBurst+tecc\_check)/tBurst\}+1,$$

where INT represents a rounding operator. tRL is used to indicate a latency from the time point at which the memory controller sends the first send command to a time point at which the first data read using the first send command appears on a bus. tBurst is used to indicate a quantity of clock cycles required for data transmission. tecc_check represents a latency from the time point at which the first data appears on the bus to the time point at which the memory controller completes the ECC detection on the first data. tecc_check includes at least a latency of a port physical layer (PHY) of the memory controller and a latency in performing the ECC detection on the first data. "1" is used to indicate that a minimum latency from a time point at which the memory controller detects that the error occurs in the first data to a time point at which the memory controller sends the data retransmission command may be one cycle.

According to a second aspect, this application provides a memory controller. The memory controller is connected to a medium controller, and the medium controller is connected to memory. The memory controller sends a first send command to the medium controller, where the first send command is used to instruct the medium controller to return data to the memory controller. When detecting that an error occurs in first data that is returned by the medium controller in response to the first send command, the memory controller determines sequence information of the first send command in a plurality of send commands that have been sent by the memory controller within a time period from a time point at which the first send command is sent to a current time. The first data is data, read by the medium controller, in the memory. Then, the memory controller sends a data retransmission command to the medium controller, where the data retransmission command includes the sequence information, and the data retransmission command is used to instruct the medium controller to resend the first data based on the sequence information.

According to the memory controller provided in this embodiment of this application, when detecting that the error occurs in the first data returned by the medium controller, the memory controller may instruct, based on the sequence information of the first send command corresponding to the first data, the medium controller to retransmit the first data, thereby implementing fast recovery of the erroneous first data. The memory controller provided in this application does not need to re-execute all read commands following a latest read command using which correct data is read before the error occurs in order to obtain correct first data. In this way, a latency in recovering erroneous data by a computer system is reduced, and performance of the computer system is improved.

With reference to the second aspect, in a first possible implementation, the first send command is a next send command of a previous send command that has been sent by the memory controller to the medium controller, and a first latency exists between a time point at which the previous send command is sent and the time point at which the first send command is sent. The memory controller is further configured to send another send command to the medium controller after a second latency when detecting that the error occurs in the first data. The second latency is greater than the first latency, and the second latency is equivalent to a time period between a time point at which a send command is last sent before the memory controller detects that the error occurs in the first data and a time point at which a send command is sent for the first time after the memory controller detects that the error occurs in the first data. According to this implementation, a conflict between commands or data on the bus may not occur.

With reference to the second aspect and the first possible implementation of the second aspect, in a second possible implementation, the data retransmission command is sent by the memory controller to the medium controller within the second latency, and the second latency includes a time for transmitting the data retransmission command and a time for the medium controller to execute the data retransmission command.

With reference to the second aspect and the first or the second possible implementation of the second aspect, in a third possible implementation, the memory controller is further configured to record a quantity of send commands that have been sent by the memory controller within the time period from the time point at which the first send command is sent to the current time. The quantity is used to indicate sequence information of the first send command in the send commands that have been sent by the memory controller within the time period from the time point at which the first send command is sent to the current time.

According to a third aspect, this application provides an error recovery method for memory data. The method is applied to a computer system including a memory controller and a medium controller. The method is performed by the medium controller to implement a function of the medium controller in the storage provided in the first aspect or any one of the possible implementations of the first aspect.

According to a fourth aspect, this application provides another error recovery method for memory data. The method is applied to a computer system including a memory controller and a medium controller. The method is performed by the memory controller to implement a function of the memory controller provided in the second aspect or any one of the possible implementations of the second aspect.

According to a fifth aspect, this application provides a computer system. The computer system includes a memory controller, a medium controller, and a memory that is connected to the medium controller. The memory is configured to store data. The memory controller is connected to the medium controller. The memory controller has a function of the memory controller provided in the second aspect and any one of the possible implementations of the second aspect, and the medium controller has a function of the medium controller in the storage provided in the first aspect and any one of the possible implementations of the first aspect.

According to a sixth aspect, this application provides a memory controller. The memory controller includes a communications interface and a control circuit that is connected to the communications interface. The control circuit can implement the error recovery method for memory data provided in the fourth aspect.

According to a seventh aspect, this application further provides a computer program product including program code. An instruction included in the program code is executed by a computer, to implement the method according to the third aspect or the fourth aspect.

According to an eighth aspect, this application further provides a computer readable storage medium. The computer readable storage medium is configured to store program code. An instruction included in the program code is executed by a computer, to implement the method according to the third aspect or the fourth aspect.

BRIEF DESCRIPTION OF DRAWINGS

To describe the technical solutions in some of the embodiments of this application more clearly, the following briefly describes the accompanying drawings describing some of the embodiments. The accompanying drawings in the following description show merely some embodiments of this application.

FIG. 5A is a schematic diagram of a format of a data retransmission command and a format of a send command according to an embodiment of this application;

FIG. 5B is a schematic diagram of another format of a data retransmission command and another format of a send command according to an embodiment of this application;

DESCRIPTION OF EMBODIMENTS

To make a person skilled in the art understand the technical solutions in this application better, the following clearly describes the technical solutions in the embodiments of this application with reference to the accompanying drawings in the embodiments of this application. The described embodiments are merely some but not all of the embodiments of this application.

Figure 1:
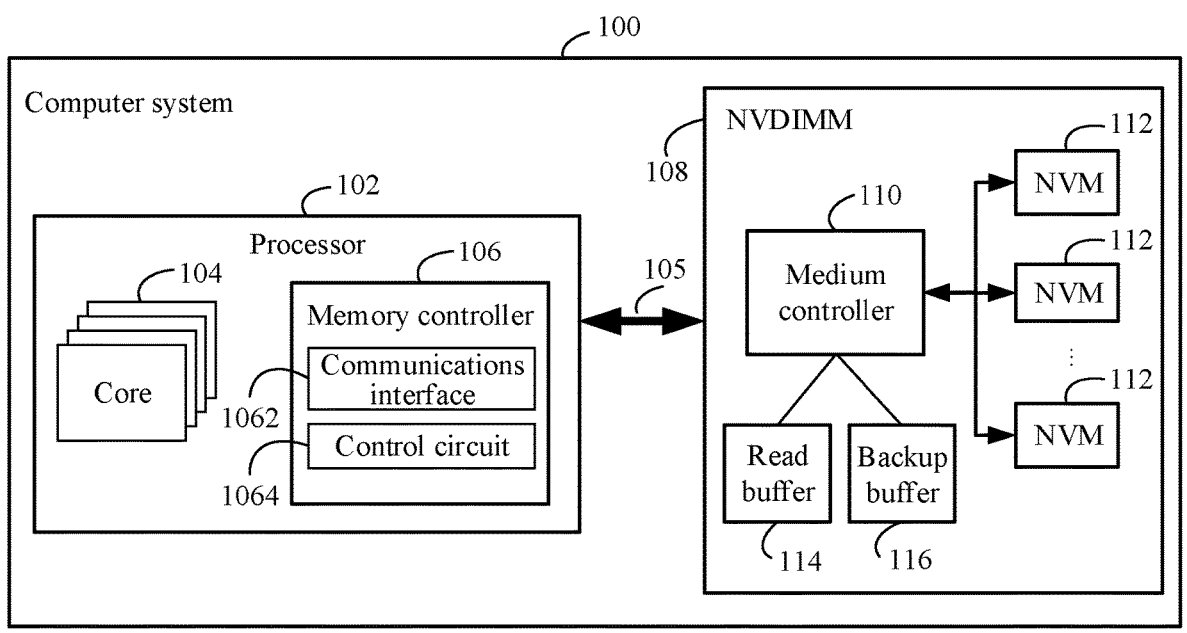
FIG. 1 is a schematic architectural diagram of a computer system according to an embodiment of this application.

FIG. 1 is a schematic architectural diagram of a computer system according to an embodiment of this application. As shown in FIG. 1, a computer system 100 may include at least a processor 102, a memory controller 106, and an NVDIMM 108. Usually, the memory controller 106 may be integrated into the processor 102. It should be noted that in the computer system 100 provided in this embodiment of this application, in addition to components shown in FIG. 1, the computer system 100 may further include a communications interface and another component such as a disk that is used as an external storage device. This is not limited herein.

The processor 102 is a computing core and a control core (control unit) of the computer system 100. The processor 102 may include one or more processor cores 104. The processor 102 may be a hyperscale integrated circuit. An operating system and another software program are installed on the processor 102 such that the processor 102 can access the NVDIMM 108, a buffer, and a disk. It may be understood that in this embodiment of this application, the core 104 in the processor 102 may be, for example, a central processing unit (CPU), or may be an application-specific integrated circuit (ASIC).

The memory controller 106 is a bus circuit controller that controls the NVDIMM 108 inside the computer system 100 and that is configured to manage and plan data transmission from the NVDIMM 108 to the core 104. Data may be exchanged between the NVDIMM 108 and the core 104 using the memory controller 106. The memory controller 106 may be a separate chip, and is connected to the core 104 through a system bus. A person skilled in the art may learn that the memory controller 106 may alternatively be integrated into the processor 102 (as shown in FIG. 1), or may be built in a northbridge. A specific location of the memory controller 106 is not limited in this embodiment of this application. In an application, the memory controller 106 may include a communications interface 1062 and a control circuit 1064, and the memory controller 106 may communicate with the processor 102 and the NVDIMM 108 through the communications interface 1062. The memory controller 106 may control, using the control circuit 1064, necessary logic to write data to the NVDIMM 108 or read data from the NVDIMM 108. The control circuit 1064 may include hardware, software, or control logic (logic or circuitry) jointly implemented by hardware and software. The memory controller 106 may alternatively include a processor to execute a program instruction in software.

The NVDIMM 108 is a RAM of the computer system 100, and may be used as memory or a storage device of the computer system 100. The NVDIMM 108 may include a medium controller 110, at least one NVM 112, a read buffer 114, and a backup buffer 116. The medium controller 110 may include a logic circuit having a control capability. The NVM 112 is configured to store various software currently running in an operating system, input and output data, information that is exchanged with an external storage device, and the like. The NVM 112 may exist in a chip form. It may be understood that the NVDIMM 108 may store an instruction, and the processor 102 may execute the instruction stored in the NVDIMM 108, to perform a corresponding operation. As described above, the NVM 112 may include an NVM that can be used as memory, such as a PCM, an RRAM, an MRAM, or an STT-MRAM. It may be understood that the NVM 112 is merely an example of a storage medium.

The memory controller 106 is connected to the NVDIMM 108 through a bus 105. The memory controller 106 communicates with the NVDIMM 108 by complying with an NVDIMM-P Protocol. The NVDIMM-P Protocol is a bus access protocol compatible with a DDR protocol. The medium controller 110 may access, according to a memory access command of the memory controller 106, data stored in the NVM 112. It may be understood that the memory access command sent by the memory controller 106 may be a read command or a write command. The medium controller 110 may read data from the NVM 112 according to the read command sent by the memory controller 106. Alternatively, the medium controller 110 may write data to the NVM 112 according to the write command sent by the memory controller 106.

In this embodiment of this application, the bus 105 may include a data bus, a command/address bus, and a read data ready feedback bus. The data bus is configured to transmit data and metadata. The command/address bus is configured to transmit a memory access command such as a read command or a write command. The read data ready feedback bus is configured to send a ready signal that is used to notify the memory controller 106 that to-be-read data is ready in the NVDIMM 108. In an application, when the memory controller 106 reads data from the NVDIMM 108 through the bus 105, the memory controller 106 first sends a read command through the command/address bus. After the medium controller 110 in the NVDIMM 108 obtains the to-be-read data from the NVM 112 according to a destination address in the read command, the NVDIMM 108 sends, to the memory controller 106 through the read data ready feedback bus, the ready signal that is used to notify that the to-be-read data is ready in the NVDIMM 108. After receiving the ready signal sent by the NVDIMM 108, the memory controller 106 sends, to the NVDIMM 108 through the command/address bus, a send command that is used to obtain data. The send command is used to instruct the medium controller 110 to send data to the memory controller 106. After a fixed latency in sending the send command by the memory controller 106, the memory controller 106 may receive, through the data bus, data that is ready in the buffer and that is sent by the medium controller 110 in response to the send command. After the memory controller 106 sends a read command, data to be read using the read command cannot be immediately returned. In addition, because the NVDIMM-P Protocol supports out-of-order execution of NVM read commands, in an application, when sending the send command, the memory controller 106 cannot learn which read command is used to read the data returned by the medium controller 110.

The read buffer 114 is configured to buffer data that is read by the medium controller 110 from the NVM 112. The read buffer 114 may include at least one buffer queue. Usually, the buffer queue buffers data in a FIFO sequence. The medium controller 110 may schedule data in the read buffer 114 in a sequence of the data in the read buffer 114. For example, the medium controller 110 may send the data in the read buffer to the memory controller 106 in a sequence of the data buffered in the buffer queue. In this embodiment of this application, instead of scheduling data in the FIFO sequence, the medium controller 110 may alternatively schedule data according to a data priority or in a sequence in which an application needs to schedule data in the buffer queue. It may be understood that in an application, the NVDIMM 108 may further include a write buffer (not shown in FIG. 1) that is configured to buffer data to be written to the NVM 112.

When an error occurs in data read from the NVM, to reduce a time for recovering the erroneous data, a backup buffer 116 is further provided in the NVDIMM 108 provided in this embodiment of this application. The backup buffer 116 is configured to buffer backup data of data that has been sent by the medium controller 110 to the memory controller 106. In this embodiment of this application, the backup buffer 116 includes a backup queue, and backup data in the backup queue is scheduled in a FIFO sequence. It may be understood that the read buffer 114 and the backup buffer 116 may use a volatile storage medium having a relatively high access speed, such as a DRAM, or may use a non-volatile storage medium NVM having a relatively high access speed. Storage medium types of the read buffer 114 and the backup buffer 116 are not limited herein.

A person skilled in the art may learn that because the NVDIMM-P Protocol supports out-of-order execution of the NVM read commands, when sending the send command to the medium controller 110 to obtain the data, the memory controller 106 cannot learn which read command is used to read the data returned by the medium controller 110. Only after obtaining the data, and detecting and parsing the obtained data, the memory controller 106 can learn, based on read ID information carried in the data, which read command is used to read the data returned by the medium controller 110. In addition, to prevent an error from occurring in a data transmission process, an ECC is usually carried during data transmission. After receiving the data sent by the medium controller 110 according to the send command, usually, the memory controller 106 first performs error correction on the received data based on ECC information, and then parses correct data obtained after the error correction. However, when the memory controller 106 finds that an unrecoverable error occurs in the received data, because the memory controller 106 cannot perform error correction on the data successfully, the memory controller 106 cannot parse the data, and therefore cannot determine which read command is used to read data in which an error occurs. In this case, in other approaches, the memory controller 106 re-executes all read commands following a latest read command using which correct data is read before the error occurs in order to recover the erroneous data. However, as described above, this manner in the other approaches may degrade performance of the computer system because a latency required for executing the read commands is relatively long.

Figure 2:
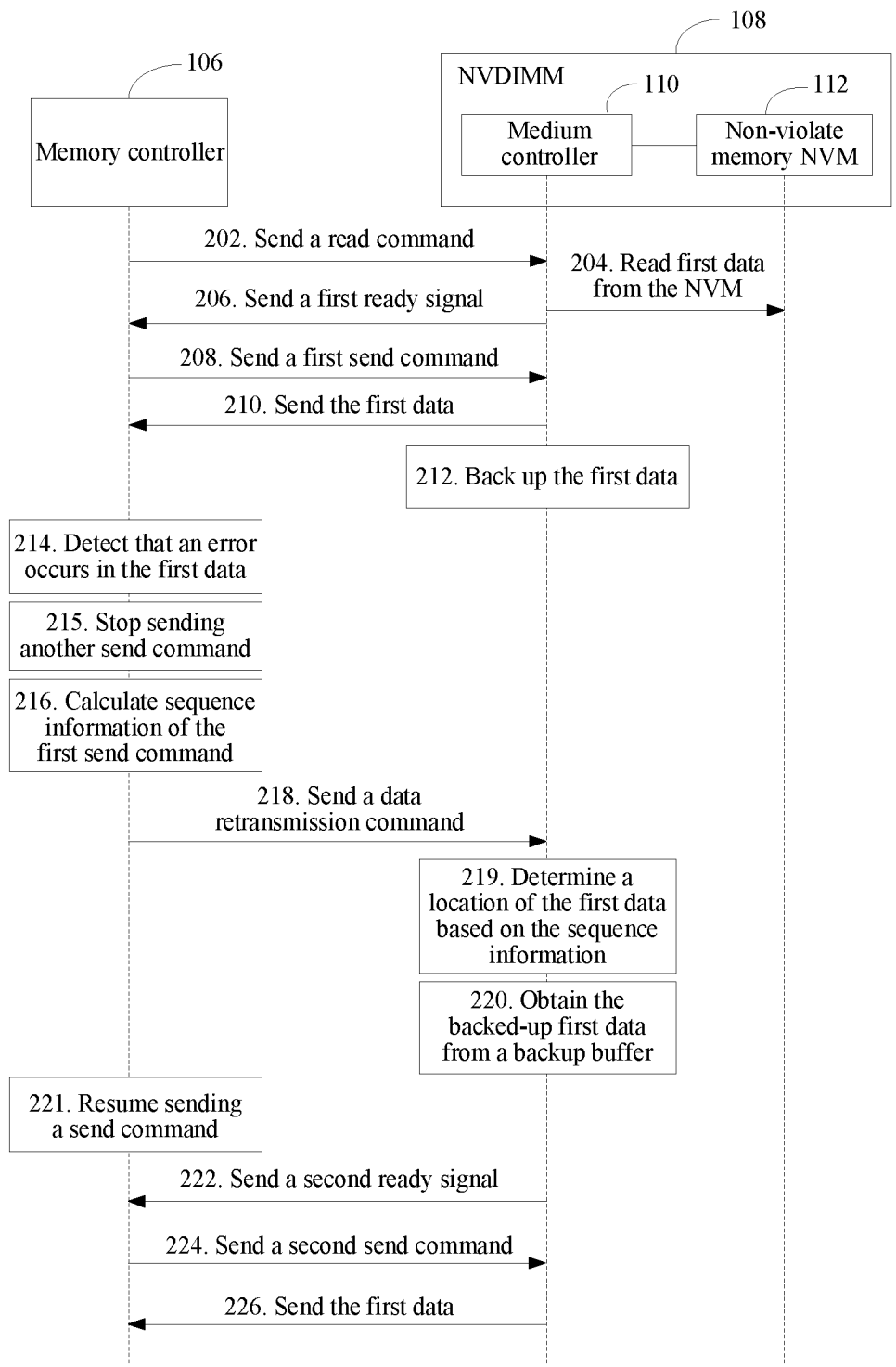
FIG. 2 is a signaling diagram of an error recovery method for memory data according to an embodiment of this application.

With reference to FIG. 1, the following describes in detail a method for recovering erroneous data when the computer system 100 finds that an error occurs in read data. FIG. 2 is a signaling diagram of an error recovery method for memory data according to an embodiment of this application. As shown in FIG. 2, the method may include the following steps.

In step 202, the memory controller 106 sends a read command to the medium controller 110. The read command is used to read first data. The read command carries an identifier (ID), an address, and a length of the read command, and the length is used to indicate a size of the first data to be read using the read command. The address is used to indicate a physical address of the first data in the NVM 112. In this embodiment of this application, the first data is used as an example for description.

In step 204, the medium controller 110 reads the first data from the NVM 112 according to the read command. Further, the medium controller 110 reads the first data from the NVM 112 according to the address and the length. After reading the first data, the medium controller 110 may buffer the first data in the read buffer 114. In this embodiment of this application, after reading the first data, the medium controller 110 may divide the first data into data blocks based on a granularity of 64 bits (B) for buffering. For example, if a first length is 128 B, the first data may be divided into two 64 B data blocks, where the two 64 B data blocks are separately buffered in the read buffer 114 of the NVDIMM 108. In an application, the read buffer 114 includes a data output queue. After reading data from the NVM 112, the medium controller 110 may place the read data into the data output queue. In this way, the medium controller 110 may send data in the data output queue to the memory controller 106. A person skilled in the art may learn that the medium controller 110 usually sends the data in the data output queue sequentially to the memory controller in a FIFO manner. It may be understood that the medium controller 110 may alternatively schedule data in the data output queue in an out-of-order manner, and send the data in the data output queue to the memory controller in an out-of-order manner.

In step 206, the medium controller 110 sends a first ready signal to the memory controller 106. As described above, when the medium controller 110 detects that data exists in the read buffer 114, the medium controller 110 sends a ready signal to the memory controller 106 through the read data ready feedback bus, where the ready signal is used to indicate that data to be read by the memory controller is ready. In this embodiment of this application, for clarity of description, the ready signal in this step is referred to as the first ready signal.

In step 208, the memory controller 106 sends a first send command to the medium controller 110. Further, after receiving the first ready signal sent by the medium controller 110, the memory controller 106 sends, to the NVDIMM 108 through the command/address bus, the first send command that is used to obtain data. The first send command is used to instruct the medium controller 110 to send the data to the memory controller 106. In this embodiment of this application, the memory controller 106 includes a send command wait queue, where the send command wait queue is used to record a sent send command and related information of data obtained using the command.

Figures 3, 4:
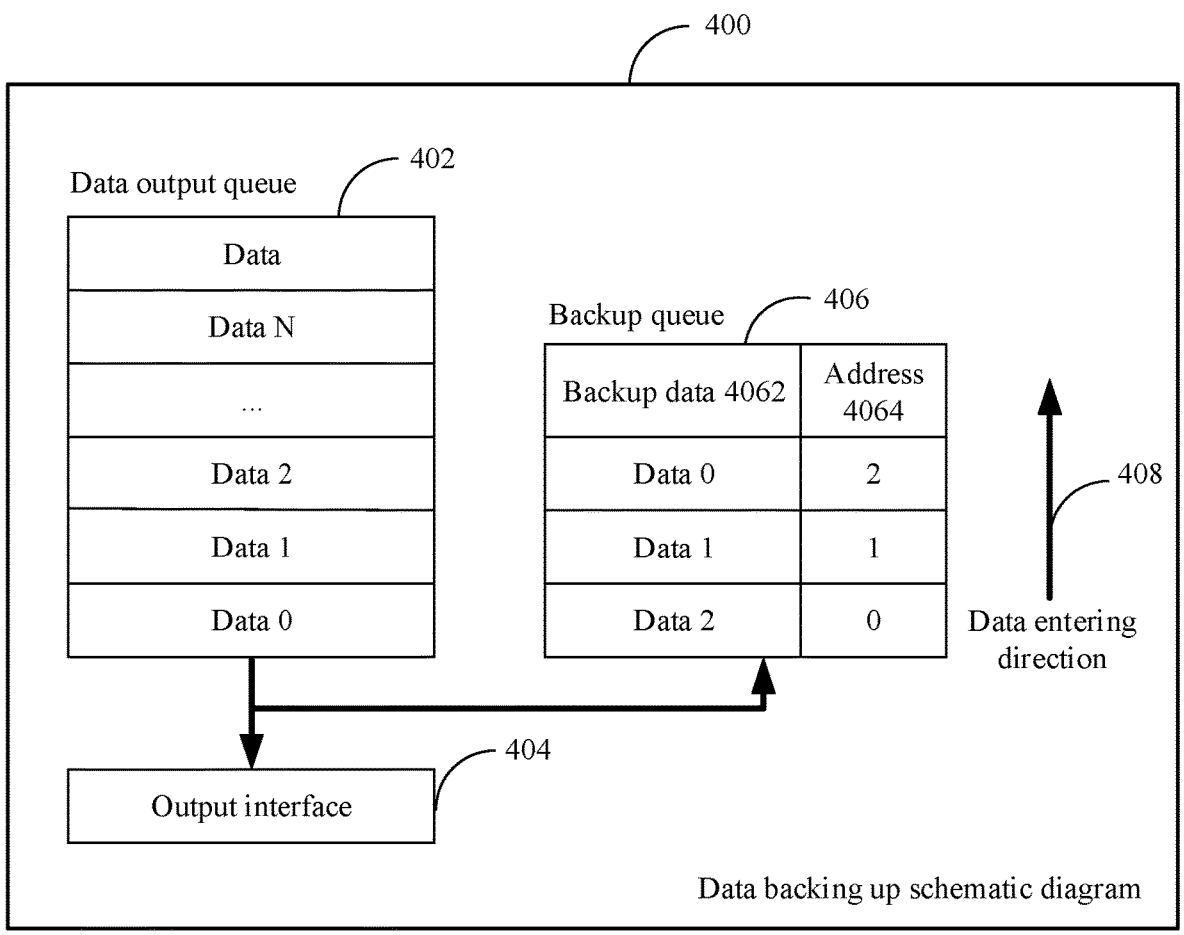
FIG. 3 is a schematic diagram of a send command wait queue according to an embodiment of this application.
FIG. 4 is a schematic diagram of backing up sent data by a medium controller according to an embodiment of this application.

As shown in FIG. 3, each entry in the send command wait queue includes at least information such as a "timer", a "counter", a "valid bit", "data", and an "ECC result". The "timer" is used to record a clock cycle from a time point at which a send command is sent to a current time. In this embodiment of this application, a value of a counter in an entry whose valid bit is valid in the send command wait queue needs to be increased by a preset fixed value each time one clock cycle passes. For example, the value of the "counter" in the entry whose valid bit is valid in the send command wait queue needs to be increased by 1 each time one clock cycle passes. The "counter" is used to record a quantity of other send commands that are sent by the memory controller after the memory controller sends a send command. In this embodiment of this application, a value of a "counter" in an entry whose valid bit is valid in the send command wait queue needs to be increased by a preset fixed value each time one send command is sent. For example, the value of the "counter" in the entry whose valid bit is valid in the send command wait queue needs to be increased by 1 each time one send command is sent.

The "valid bit" is used to indicate whether an entry of the send command is valid. That is, the valid bit is used to indicate whether the send command is completed. If the send command is completed, a valid bit of the entry corresponding to the send command is set to an identifier used to indicate "invalid". If the send command is not completed, a valid bit of the corresponding entry is set to an identifier used to indicate "valid". In this embodiment of this application, that the send command is completed means that no error is found when data returned according to the send command has undergone ECC detection. In addition, the memory controller has started to perform another processing procedure (for example, a processing procedure such as data packet parsing) after ECC detection is performed on data obtained using the send command. If data to be obtained using the send command is not obtained, or ECC detection on data obtained using the send command is not completed, it is considered that the send command is not completed, and a valid bit of the send command is set to an identifier used to indicate "valid". In this embodiment of this application, the identifier used to indicate "valid" may be "1", and the identifier used to indicate "invalid" may be "0". In an application, other identifiers may alternatively be used to indicate "valid" and "invalid". This is not limited herein.

"Data" is used to record the data obtained using the send command. A person skilled in the art may learn that in a fixed clock cycle after the memory controller 106 sends the send command, the medium controller returns data to the memory controller. In this embodiment of this application, when data is returned on the NVDIMM-P bus, the memory controller 106 may store the returned data in an entry of a corresponding send command wait queue by matching a timer. The "ECC result" is used to record a result obtained by the memory controller 106 by detecting data based on an ECC code carried in the data. In an application, a specified detection identifier may be used to indicate an ECC detection result. For example, "1" may be used to indicate that the data is correct, and "0" may be used to indicate that the data is incorrect. Certainly, in an application, another identifier may alternatively be used to indicate the ECC detection result. After the data matches an entry in the corresponding send command wait queue, the memory controller 106 may start to perform ECC detection on the data. After the ECC detection ends, an ECC detection result may be recorded in an "ECC result" field of the entry.

In this embodiment of this application, when sending one send command, the memory controller 106 adds one entry in the send command wait queue. When the entry is added, the entry needs to be added in a same direction of the queue. For example, entries each are added to the head of the queue in sequence. Alternatively, entries may be added to the tail of the queue in sequence. For example, when the memory controller 106 sends the first send command, the memory controller 106 may add the first send command to the tail of the send command wait queue, and set pieces of information in an entry corresponding to the first send command as follows respectively: a value of a timer: 0, a value of a counter: 0, a valid bit: valid, a data bit: null, and an ECC result: null. When the memory controller 106 sends a second send command, the memory controller 106 may add a new entry to the tail of the send command wait queue, and set pieces of information in the entry corresponding to the second send command as follows respectively: a value of a timer: 0, a value of a counter value: 0, a valid bit: valid, a data bit: null, and an ECC result: null. The information in the entry corresponding to the first send command is updated. For example, the value of the counter in the entry of the first send command is updated to 1.

It may be understood that in an application, the memory controller may update the information in the send command wait queue based on a quantity of sent send commands and a status of processing obtained data. Details may be shown in FIG. 3. A person skilled in the art may understand that because a plurality of send commands sent by the memory controller are the same, and a fixed latency (for example, the fixed latency is set based on a timer) exists between a time point at which a send command is sent and a time point at which data obtained using the send command, in an application, the send command wait queue may not include information such as an identifier of the send command. In this case, the memory controller may distinguish between, based on times for sending send commands and times for receiving corresponding pieces of data, the send commands corresponding to the pieces of data.

In step 210, the medium controller 110 sends the first data to the memory controller 106. As described above, after the fixed latency in sending the send command by the memory controller 106, the medium controller 110 returns the data that is ready in the buffer to the memory controller 106 through the data bus. However, because an NVM read latency is not fixed, and an NVDIMM-P Protocol supports out-of-order scheduling of a read command, before parsing read data, the memory controller does not learn which read command is used to read the obtained data. For ease of description, the data returned by the medium controller 110 after the fixed latency in sending the first send command by the memory controller 106 is referred to as the first data. In this embodiment of this application, the data sent by the medium controller 110 to the memory controller 106 may alternatively be referred to as data obtained using a send command sent by the memory controller 106. For example, the data obtained using the first send command is the first data.

In step 212, the medium controller 110 backs up the first data. In this embodiment of this application, to enable the memory controller to quickly obtain correct data when an error occurs in read data, the medium controller 110 to further back up sent data when sending the data in the data output queue in the read buffer 114 to the memory controller 106. As described above, the backup buffer 116 is further provided in the NVDIMM provided in this embodiment of this application. The backup buffer 116 is configured to buffer data sent by the medium controller 110 to the memory controller 106. Further, in this step, when sending the first data to the memory controller 106, the medium controller 110 also buffers the first data in the backup buffer 116. In this embodiment of this application, the backup buffer 116 may include a backup queue, and backup data in the queue is scheduled according to a FIFO scheduling rule. In this manner, the backup data needs to enter the backup queue in a same direction.

FIG. 4 is a schematic diagram of backing up sent data by the medium controller 110. As shown in FIG. 4, the medium controller responds to each of a plurality of send commands sent by the memory controller, and separately sends data in a data output queue 402 to the memory controller through an output interface 404. Further, each time the medium controller sends one piece of data, the medium controller backs up the data into a backup queue 406 of the backup buffer 116. The data output queue 402 is a segment of storage space, and the backup queue 406 is also a segment of storage space. In this embodiment of this application, the data output queue is configured to buffer data to be sent by the medium controller to the memory controller, and the backup queue 406 is configured to buffer backup data of data that has been sent by the medium controller to the memory controller. The backup queue 406 may be a FIFO queue. A direction in which backup data 4062 enters the backup queue 406 may be shown as 408. In an application, an address 4064, in the backup queue 406, corresponding to each piece of backup data 4062 may be obtained based on a location of the backup data 4062 in the backup queue 406. For clarity of description, the address of the backup data in the backup queue 406 may be shown as 4064 in FIG. 4. Because pieces of backup data 4062 sequentially enter the backup queue from the same direction, a sequence number of backup data in the backup queue may be used as an address of the backup data in the backup queue. It may be understood that as data enters the backup queue increases, a sequence number of each piece of backup data in the backup queue changes. Therefore, an address of a piece of backup data in the backup queue also changes with an increase of backup data that enters the queue.

For example, when the medium controller 110 sends Data 0 to the memory controller in response to the first send command, the Data 0 is backed up into the backup queue 406. In this case, an address of the Data 0 in the backup queue 406 is 0. Then, when the medium controller 110 sends Data 1 to the memory controller 106 in response to the second send command, the Data 1 also enters the backup queue 406. In this case, an address of the Data 1 in the backup queue 406 is 0, and the address of the Data 0 in the backup queue 406 changes to 1. Further, when the medium controller 110 sends Data 2 to the memory controller 106 in response to a third send command, the Data 2 also enters the backup queue 406. In this case, as shown in FIG. 4, because the Data 2 is latest data that enters the backup queue 406, an address of the Data 2 in the backup queue 406 is 0, the address of the Data 1 in the backup queue 406 is updated to 1, and the address of the Data 0 in the backup queue 406 is updated to 2.

A person skilled in the art may learn that when the medium controller 110 returns data to the memory controller 106 in response to a send command, a data block of a fixed granularity is returned each time. The fixed granularity may be, for example, 64 bytes or 128 bytes. This is not limited herein. In this embodiment of this application, a quantity of data blocks that can be buffered by the backup buffer 116 needs to be greater than or equal to a quantity of send commands that can be sent by the memory controller 106 within a time period from a time point at which the memory controller 106 sends the first send command to a time point at which the memory controller 106 completes an ECC detection on the first data. For example, the Data 0 shown in FIG. 4 is the first data in this embodiment of this application. In this case, a capacity of the backup buffer 116 needs to be greater than or equal to a total amount of data obtained using send commands that can be sent by the memory controller within a time period from a time point at which the memory controller 106 sends the first send command used to obtain the Data 0 to a time point at which the memory controller 106 completes an ECC detection on the Data 0. Because data obtained using each send command is data of a fixed size, the capacity of the backup buffer 116 may be determined based on a quantity of send commands that have been sent by the memory controller within the time period from the time point at which the memory controller sends the first send command to the time point at which the memory controller completes ECC detection on the first data. In an application, the quantity S of send commands that can be sent by the memory controller 106 within the time period from the time point at which the memory controller 106 sends the first send command to the time point at which the memory controller 106 completes ECC detection on the first data may be obtained according to the following formula:

$$S=INT\{(tRL+tBurst+tecc\_check)/tBurst\}+1,$$

where INT represents a rounding operator. tRL is used to indicate a latency from the time point at which the memory controller sends the first send command to a time point at which the first data read using the first send command appears on a bus. tBurst is used to indicate a quantity of clock cycles required for data transmission. tecc_check represents a latency from a time point at which the first data appears on the bus to the time point at which the memory controller completes the ECC detection on the first data. tecc_check includes at least a latency of a port PHY of the memory controller and a latency in performing the ECC detection on the first data. "1" is used to indicate that a minimum latency from a time point at which the memory controller detects that an error occurs in the first data to a time point at which the memory controller sends a data retransmission command may be one cycle. In this manner, a minimum value of the capacity of the backup buffer 116 is a size of S data blocks. It should be noted that in this embodiment of this application, the first data also refers to a first data block.

In step 214, the memory controller 106 detects that the error occurs in the first data. As described above, to prevent an error from occurring in a data transmission process, an ECC is usually carried during data transmission. In this step, after receiving the first data, the memory controller 106 may perform check and error correction on the received first data based on ECC information carried in the first data. When the memory controller 106 finds that an unrecoverable error occurs in the data, the method goes to step 215.

In step 215, the memory controller 106 stops sending another send command used to obtain data. In this embodiment of this application, when the memory controller 106 detects that the error occurs in the first data received by the memory controller 106, to recover the erroneous first data, the memory controller 106 stop sending a send command used to obtain other data. It should be noted that in this embodiment of this application, although the memory controller 106 stops sending another send command, the memory controller 106 can still receive data returned by the medium controller 110. The method goes to step 216.

According to an embodiment, the memory controller 106 may be set to a normal state or an abnormal state. A send command used to obtain data is sent only when the memory controller 106 is in the normal state. When the memory controller 106 is in the abnormal state, the memory controller 106 stops sending a send command used to obtain data. For example, the memory controller 106 may include a timer used to set when to send a send command in the normal state. That is, the memory controller may determine, based on the timer, a latency between time points for sending two consecutive send commands. The memory controller 106 may turn off the timer to enter the abnormal state, and stop sending a send command. Certainly, it may be understood that in an application, the memory controller 106 may alternatively control, in another manner, when to send a send command or stop sending a send command.

In step 216, the memory controller 106 determines sequence information of the first send command in a plurality of send commands that have been sent by the memory controller within a time period from the time point at which the first send command is sent to a current time. In this embodiment of this application, the sequence information of the first send command may be obtained based on a value of a counter in an entry that is corresponding to the first data and that is in the send command wait queue. In this embodiment of this application, in an example in which a send command used to obtain the first data is the first send command, the value of the counter in the entry that is corresponding to the first data is the sequence information of the first send command. In addition, because the entry corresponding to the first send command starts to be recorded after the first send command is sent, the sequence information of the first send command may also be used to indicate a quantity of send commands further sent by the memory controller within a time period from the time point at which the first send command is sent to a time point at which it is currently detected that the first data is erroneous data.

In step 218, the memory controller 106 sends a data retransmission command to the medium controller 110. The data retransmission command is used to instruct the medium controller 110 to resend the first data to the memory controller. The data retransmission command includes the sequence information of the first send command. In an application, the data retransmission command may be transmitted through the command/address bus of the bus 105 shown in FIG. 1. A format of the data retransmission command complies with the NVDIMM-P Protocol.

FIG. 5A is a schematic diagram of a format of a data retransmission command and a format of a send command according to an embodiment of this application. A format of a data retransmission command 504 and a format of a send command 502 shown in FIG. 5A are described using an example in which an interface connecting the NVDIMM 108 and the memory controller is a DDR fifth-generation synchronous dynamic RAM (DDR5) interface. For ease of description, the data retransmission command 504 is used as an example for detailed description. As shown in FIG. 5A, one data retransmission command may be transmitted in two cycles. A chip select (CS) signal in a first cycle is low (L), a second cycle follows the first cycle, and a chip select signal in the second cycle is high (H). Each cycle further includes a rising edge of a clock and a falling edge of the clock. As shown in FIG. 5A, according to an NVDIMM-P Protocol, both a rising edge and a falling edge of a command/address bus clock signal can be used to transmit data information. For example, as shown in FIG. 5A, for information transmitted on the rising edge of the clock, reference may be made to the "Command/Address Signal Rising CLK_t" part in FIG. 5A. For information transmitted on the falling edge of the clock, reference may be made to the "Command/Address Signal Falling CLK_t" part in FIG. 5A. Further, the data retransmission command 504 provided in this embodiment of this application may include the following fields. A "CS" bit is a chip select signal field, and is used to indicate whether the NVDIMM is selected. A Rec Pointer [3:0] field is used to indicate sequence information of a first send command. That is, the Rec Pointer [3:0] field is used to indicate sequence information of a send command corresponding to to-be-retransmitted data. In this case, the medium controller may determine a location of the to-be-retransmitted data in the backup buffer based on the information. A "Mod" field and the part CA0 to CA6 that is transmitted on the rising edge are combined to indicate whether the command is a data retransmission command. In an application, for the data retransmission command and the send command, information in the part CA0 to CA6 that is transmitted on the rising edge may be the same, but the send command 502 may be distinguished from the data retransmission command 504 using the field "Mod". For example, as shown in FIG. 5A, for both the data retransmission command 504 and the send command 502, CA0 to CA6 bits transmitted on the rising edge may be H, L, H, H, H, L, and RFU respectively, but a "Mod" field in the send command 502 is different from a "Mod" field in the data retransmission command 504. For example, a value of the "Mod" field in the send command 502 may be 000, and a value of the "Mod" field in the data retransmission command 504 may be 001. An "RFU" field in the send command and an "RFU" field in the data retransmission command shown in FIG. 5A are unused reserved fields.

FIG. 5B is a schematic diagram of another format of a data retransmission command and another format of a send command according to an embodiment of this application. A format of a data retransmission command 508 and a format of a send command 506 shown in FIG. 5B are described using an example in which an interface connecting the NVDIMM 108 and the memory controller is a DDR fourth-generation synchronous dynamic RAM (DDR4) interface. For ease of description, the data retransmission command 508 is used as an example for description. As shown in FIG. 5B, a "CKE_0" bit is used to indicate clock information. A "CS n" bit is a chip select signal bit, and is used to indicate whether the NVDIMM is selected (selected). "ACT_n" bit is an activated signal bit, and is used to indicate whether the NVDIMM is activated. A16, A15, and A14 bits of the send command 506 may be the same as A16, A15, and A14 bits of the data retransmission command 508, and an "A13" bit is used to distinguish whether the command is a data retransmission command. For example, when the "A13" bit indicates a high level "H", the "A13" bit is used to indicate that the command is a data retransmission command, or when the "A13" bit indicates a high level "H", the "A13" bit is used to indicate that the command is a send command. When the command is a data retransmission command, a Rec Pointer [3:0] field is used to indicate sequence information of a first send command. That is, the Rec Pointer [3:0] field is used to indicate sequence information of a send command corresponding to to-be-retransmitted data. An "RFU" field in the send command and an "RFU" field in the data retransmission command shown in FIG. 5B are unused reserved fields.

It may be understood that FIG. 5A and FIG. 5B show merely examples of a command format of the data retransmission command and a command format of the send command according to this embodiment of this application. It may be understood that the data retransmission command shown in FIG. 5A and FIG. 5B is constructed based on the send command. In an application, the data retransmission command may alternatively be constructed based on a specific protocol type and a similar command.

In step 219, the medium controller 110 may determine a location of the first data in the backup buffer 116 based on the sequence information. Because the memory controller sends one send command and the medium controller returns one piece of data after a fixed latency, there is a one-to-one correspondence between a send command sent by the memory controller and data sent by the medium controller according to the send command. In addition, in this embodiment of this application, because the medium controller sequentially places pieces of data into the backup queue in a same direction when backing up the data, and data in the backup queue is scheduled in a FIFO sequence, the sequence information of the first send command may further indicate a location of the first data in the backup queue. Further, after receiving the data retransmission command sent by the memory controller, the medium controller may obtain, based on the sequence information that is of the first send command and that is carried in the data retransmission command, location information of the first data that needs to be retransmitted in the backup buffer 116. For example, the first data is Data 0. When detecting that an error occurs in the Data 0, the memory controller obtains, based on the value of the counter in the recorded information, shown in FIG. 3, of the send command, that the sequence information of the first send command is 2. After receiving the data retransmission command sent by the memory controller, the medium controller may determine, based on the sequence information that is of the first send command and that is in the data retransmission command, that the location information of the first data in the backup buffer 116 is 2.

Figure 6:
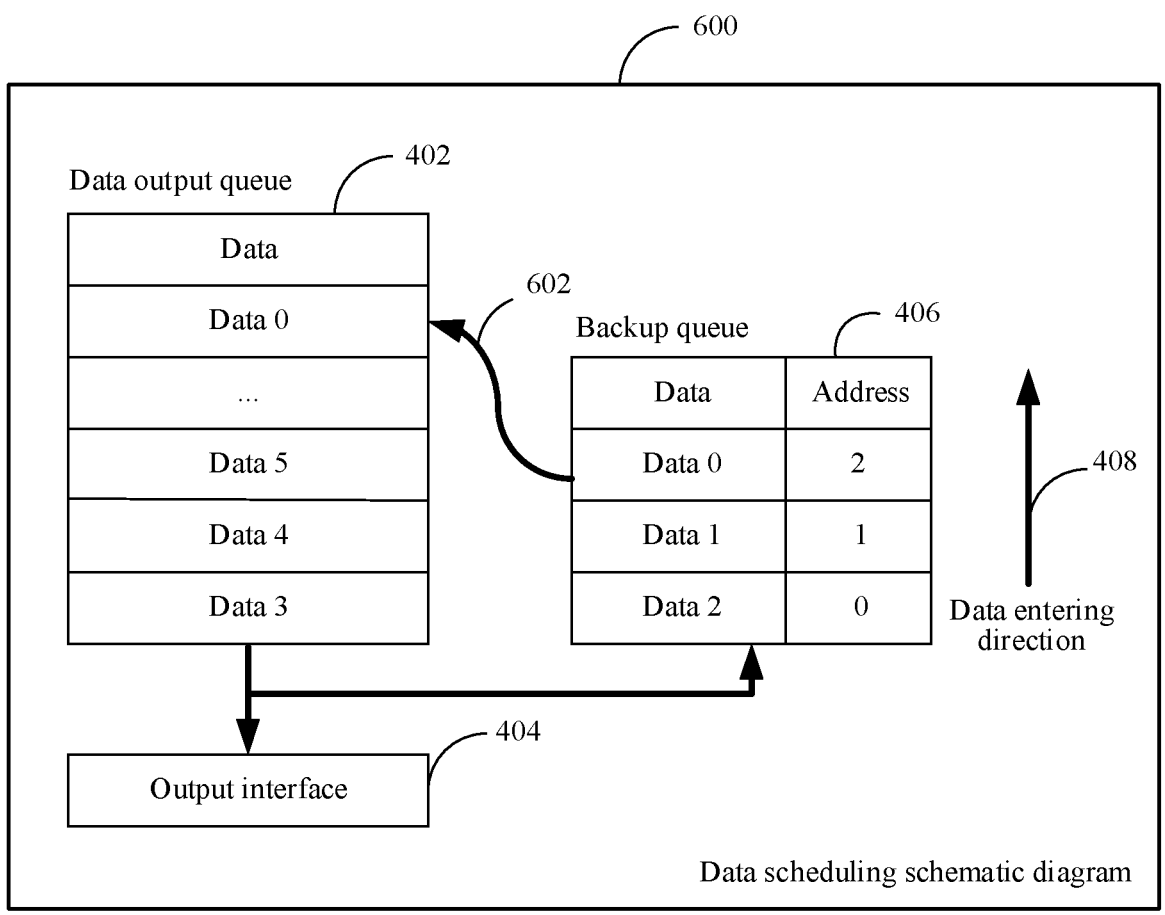
FIG. 6 is a schematic diagram of obtaining backup data by a medium controller according to an embodiment of this application.

In step 220, the medium controller 110 obtains the backed-up first data from the backup buffer 116. In an application, after determining the location information of the first data in the backup buffer 116, the medium controller 110 may obtain the first data at the corresponding location from the backup buffer 116, and place the first data into the data output queue 402 of the read buffer 114. In this way, the medium controller 110 may resend the first data in the data output queue 402 to the memory controller. FIG. 6 is a schematic diagram of obtaining backup data by a medium controller according to an embodiment of this application. Further, as shown in FIG. 6, it is assumed that the location information of the first data is 2, and the medium controller 110 may copy the first data corresponding to a backup FIFO address 2 in the backup queue to the data output queue 402 of the read buffer 114, which may be shown as 602 in FIG. 6. In an application, the medium controller 110 may place the first data at the tail of the data output queue 402, or may place the first data at the head of the data output queue 402. This is not limited herein.

In step 221, the memory controller 106 resumes sending a send command. As described above, when the memory controller 106 detects that the error occurs in the first data, the memory controller 106 stops sending a send command used to obtain data in the read buffer 114 of the medium controller 110. In this step, after the memory controller 106 sends the data retransmission command to the medium controller 110, the memory controller 106 may resume sending, to the medium controller 110, a send command used to obtain other data. For clarity of description, in this embodiment of this application, the first send command that the memory controller resumes sending after sending the data retransmission command is referred to as a second send command.

Figure 7:
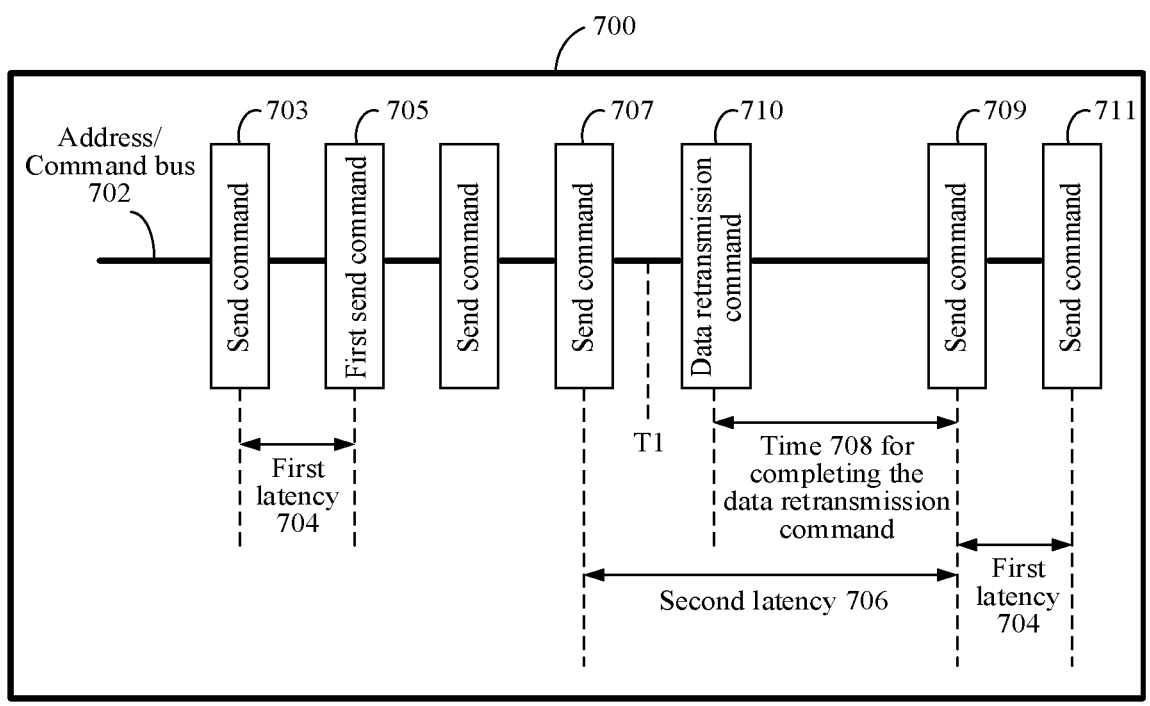
FIG. 7 is a sequence diagram of commands sent by a memory controller according to an embodiment of this application.

In this embodiment of this application, because an NVDIMM-P bus protocol is compatible with a standard DDR bus protocol, a data bus of the NVDIMM-P bus protocol is multiplexed. In this manner, both a write command sent by the memory controller 106 and a send command used to obtain data multiplex a same data bus. Therefore, to prevent a conflict of commands on the bus, when sending a send command to the medium controller 110, the memory controller 106 needs to comply with a specified time sequence in order to precisely schedule each memory access command. In this embodiment of this application, when the memory controller 106 resumes sending the send command after sending the data retransmission command, a specified time sequence also needs to be satisfied between the data retransmission command and the second send command. Otherwise, a conflict may occur. For clarity of description, this embodiment of this application provides a sequence diagram of commands sent by the memory controller. As shown in FIG. 7, in this embodiment of this application, the memory controller sends a send command to the medium controller through an address/command bus 702. If a first latency 704 exists between a time point at which the memory controller 106 sends a previous send command 703 of a first send command 705 and a time point at which the memory controller 106 sends the first send command 705, the memory controller 106 detects, at a time point Ti shown in FIG. 7, that the error occurs in the first data. When detecting that the error occurs in the first data, the memory controller 106 may resume sending another send command to the medium controller 110 after a second latency 706. The second latency 706 is greater than the first latency 704. The second latency 706 is equivalent to a time period between a time point at which a send command 707 is last sent before the memory controller 106 detects that the error occurs in the first data and a time point at which a send command 709 is sent for the first time after the memory controller 106 detects that the error occurs in the first data. The previous send command 703 of the first send command and the first send command 705 are two consecutive send command that are sent at time points. It may be understood that after the memory controller resumes sending the send command 709, the memory controller may further send a next send command 711 based on the first latency 704.

In an application, to avoid a command conflict, the second latency 706 also needs to be greater than a time 708 for completing the data retransmission command. The time 708 for completing the data retransmission command includes a latency between a time point at which the memory controller 106 sends a data retransmission command 710 to the time point at which the memory controller 106 sends the send command 709 for the first time after the memory controller 106 detects that the error occurs in the first data. Further, the latency required for completing the data retransmission command includes at least a time for transmitting the data retransmission command on the bus, a time for the medium controller 110 to parse the data retransmission command, and a time for the medium controller 110 to execute the data retransmission command to copy data from backup FIFO queue of the backup buffer 116 to data output FIFO queue. In an application, values of the first latency 704 and the second latency 706 may be further set based on specific situations such as memory bus bandwidth and a size of data obtained using a send command. This is not limited herein.

In step 222, the medium controller 110 sends a second ready signal to the memory controller 106. Further, after the medium controller 110 places the first data in the data output queue of the read buffer 114, the medium controller 110 sends a ready signal to the memory controller 106, to notify the memory controller 106 that the medium controller 110 is ready for data. For clarity of description, in this embodiment of this application, the ready signal sent by the medium controller 110 to the memory controller 106 in this step is referred to as the second ready signal.

In step 224, the memory controller 106 sends a second send command to the medium controller 110. In an application, after the memory controller 106 receives a second ready signal sent by the medium controller 110, the memory controller 106 sends a send command to the medium controller 110, to obtain data in the read buffer 114 of the NVDININI. For clarity of description, in this embodiment of this application, the send command sent by the memory controller 106 to the medium controller 110 in this step is referred to as the second send command.

In step 226, the medium controller 110 sends the first data to the memory controller 106. Further, after receiving the second send command, the medium controller 110 resends the first data in the data output FIFO queue to the memory controller 106 in response to the second send command after a fixed latency.

It should be noted that because a send command does not carry an identifier, and each send command is used to obtain data of a fixed granularity, when sending a send command, the memory controller 106 does not learn which data is obtained using the send command. When sending data to the memory controller in response to a send command, the medium controller 110 does not learn which send command the medium controller 110 responds to, either. In this embodiment of this application, for ease and clarity of description, several send commands sent by the memory controller are referred to as a first send command, a second send command, and the like respectively.

According to the error recovery method for memory data provided in this embodiment of this application, when detecting that the error occurs in the first data returned by the medium controller, the memory controller may determine the sequence information of the first send command corresponding to the first data, and send a data retransmission command including the sequence information to the medium controller such that the medium controller may obtain the backed-up first data from the backup buffer based on the received sequence information, and send the backed-up first data to the memory controller, thereby implementing recovery of the erroneous first data. According to the method provided in this embodiment of this application, the memory controller does not need to re-execute all read commands following a latest read command using which correct data is read before the error occurs in order to obtain correct the first data. In this way, a latency in recovering erroneous data by a computer system is reduced, and performance of the computer system is improved.

Figure 8:
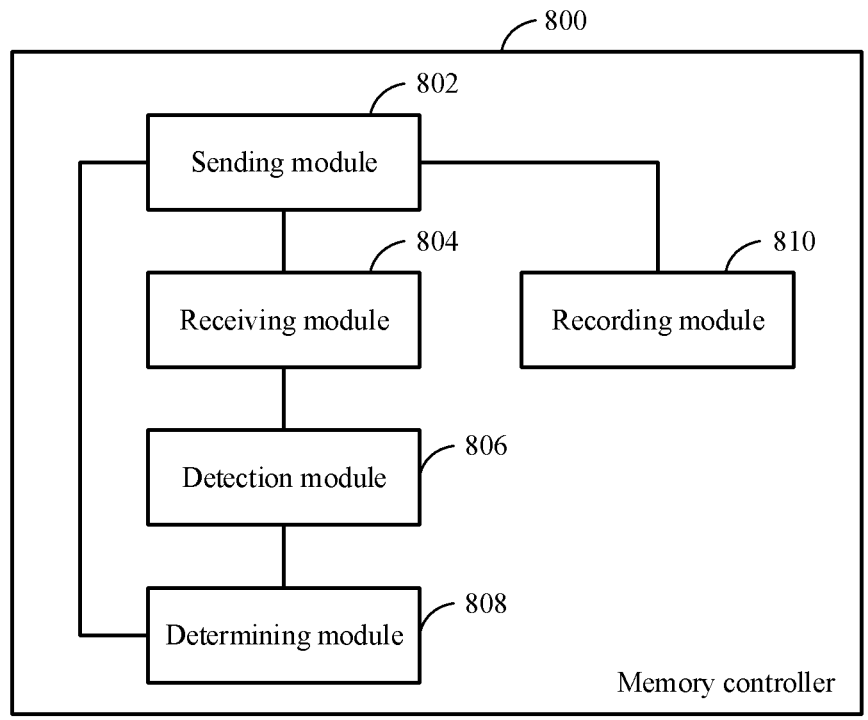
FIG. 8 is a schematic structural diagram of a memory controller according to an embodiment of this application.

FIG. 8 is a schematic structural diagram of a memory controller according to an embodiment of this application. As shown in FIG. 8, a memory controller 800 may include a sending module 802, a receiving module 804, a detection module 806, and a determining module 808. The sending module 802 is configured to send a first send command to a medium controller, where the first send command is used to instruct the medium controller to return data to the memory controller. The receiving module 804 is configured to receive first data that is sent by the medium controller in response to the first send command. The first data is data, read by the medium controller, in a memory. The detection module 806 is configured to detect that an error occurs in the first data that is returned by the medium controller in response to the first send command. The determining module 808 is configured to determine sequence information of the first send command in a plurality of send commands that have been sent by the memory controller within a time period from a time point at which the first send command is sent to a current time. The sending module 802 is further configured to send a data retransmission command to the medium controller, where the data retransmission command includes the sequence information, and the data retransmission command is used to instruct the medium controller to resend the first data based on the sequence information.

In another case, the first send command is a next send command of a previous command that has been sent by the memory controller to the medium controller. That is, the previous send command and the first send command are two consecutive send commands that are sent at time points. A first latency exists between times for sending the previous send command and the first send command. In an embodiment, if the memory controller is in a normal state, a time interval limitation of the first latency exists between times for sending each pair of consecutive send commands.

The sending module 802 is further configured to, when it is detected that the error occurs in the first data, send another send command to the medium controller after a second latency. The second latency is greater than the first latency, and the second latency is equivalent to a time period between a time point at which a send command is last sent before the memory controller detects that the error occurs in the first data and a time point at which a send command is sent for the first time after the memory controller detects that the error occurs in the first data. In an application, the data retransmission command is sent by the memory controller to the medium controller within the second latency, and the second latency includes a time for transmitting the data retransmission command and a time for the medium controller to execute the data retransmission command.

In still another case, the memory controller further includes a recording module 810. The recording module 810 is configured to record a quantity of send commands that have been sent by the memory controller within the time period from the time point at which the first send command is sent to the current time. The quantity is used to indicate sequence information of the first send command in the send commands that have been sent by the memory controller within the time period from the time point at which the first send command is sent to the current time.

It should be noted that the memory controller shown in FIG. 8 may be the memory controller 106 shown in FIG. 1. For specific functions of modules in the memory controller shown in FIG. 8, reference may be made to specific description of method steps performed by the memory controller in the foregoing method embodiment, and details are not described herein.

Figure 9:
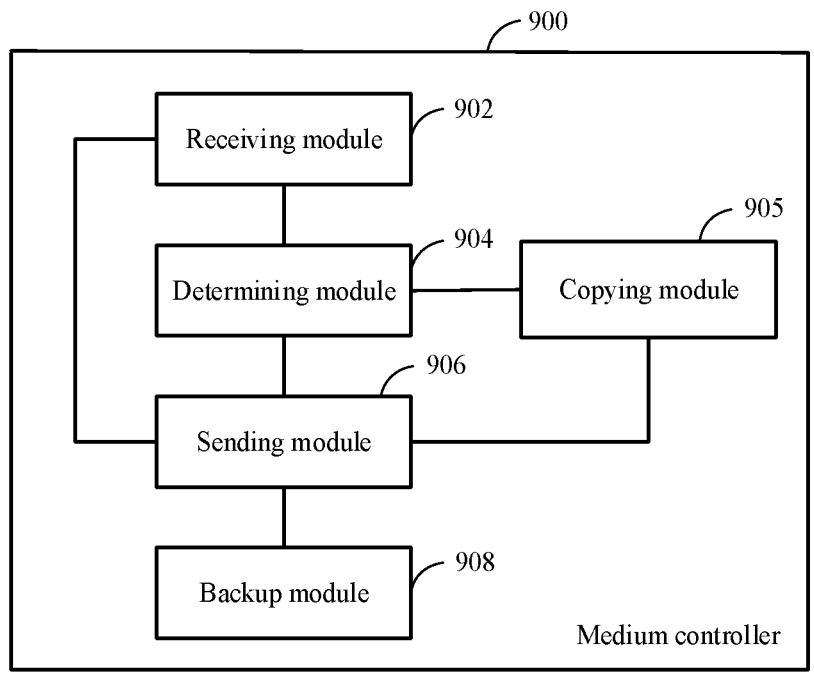
FIG. 9 is a schematic structural diagram of a medium controller according to an embodiment of this application.

FIG. 9 is a schematic structural diagram of a medium controller according to an embodiment of this application. As shown in FIG. 9, a medium controller 900 may include a receiving module 902, a determining module 904, and a sending module 906. Further, the receiving module 902 is configured to receive a data retransmission command that is sent by a memory controller and that is used to instruct the medium controller to resend first data, where the data retransmission command includes sequence information of a first send command used to obtain the first data, the first data is data that is sent by the medium controller to the memory controller in response to the first send command, and the sequence information is used to indicate a sequence of the first send command in a plurality of send commands that have been sent by the memory controller within a time period from a time point at which the first send command is sent to a current time.

The determining module 904 is configured to determine location information of the first data in a backup buffer based on the sequence information, where the backup buffer is configured to back up data that has been sent by the medium controller to the memory controller. The sending module 906 is configured to send, to the memory controller based on the location information, the first data backed up in the backup buffer. The backup buffer buffers a plurality of pieces of data that have been sent by the medium controller to the memory controller. The plurality of pieces of data are buffered in the backup buffer by the medium controller according to a plurality of responded send commands respectively. The medium controller is further configured to schedule data in the backup buffer in a sequence of receiving the plurality of send commands and according to a FIFO rule.

In another case, the medium controller 900 further includes a backup module 908. The backup module 908 is configured to buffer the first data in the backup buffer when the first data is sent to the memory controller according to the first send command.

In still another case, the medium controller further includes a copying module 905. The copying module 905 is configured to copy the first data buffered in the backup buffer to a read buffer based on the location information of the first data in the backup buffer, where the location information is determined by the determining module 904. The read buffer is configured to buffer data to be sent by the medium controller to the memory controller. The receiving module 902 is further configured to receive a second send command sent by the memory controller. The sending module 906 is further configured to resend the first data in the read buffer to the memory controller according to the second send command.

It should be noted that the medium controller shown in FIG. 9 may be the medium controller 110 shown in FIG. 1. For specific functions of modules in the medium controller shown in FIG. 9, reference may be made to specific description of method steps performed by the medium controller 110 in the foregoing method embodiment, and details are not described herein.

A person of ordinary skill in the art may be aware that in combination with the examples described in the embodiments disclosed in this specification, methods and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber) or wireless (for example, infrared, microwave, or the like) manner. The computer-readable storage medium may be any usable medium accessible by the computer, or a data storage device, such as a server or a data center, integrating one or more usable media. The usable medium may be a non-transitory machine-readable medium that can store program code, such as a magnetic medium (for example, a FLOPPY DISK, a hard disk, or a magnetic tape), an optical medium (for example, an optical disc), or a semiconductor medium (for example, a solid-state drive (SSD)).

It should be noted that the embodiments provided in this application are merely examples. A person skilled in the art may be clearly aware that for convenience and conciseness of description, in the foregoing embodiments, the embodiments emphasize different aspects, and for a part not described in detail in one embodiment, reference may be made to relevant description of another embodiment. The embodiments of this application, claims, and features disclosed in the accompanying drawings may exist independently, or exist in a combination. Features described in a hardware form in the embodiments of this application may be executed by software, and vice versa. This is not limited herein.

What is claimed is:

1. A storage, comprising:
a storage medium configured to store data; and
a medium controller coupled to the storage medium and configured to:
receive a first send command from a memory controller;
send, in response to the first send command, first data to the memory controller;
receive a data retransmission command from the memory controller, wherein the data retransmission command instructs the medium controller to resend the first data, wherein the data retransmission command comprises sequence information, wherein the sequence information indicates a quantity of send commands from the memory controller within a time period from a first time point at which the first send command is sent to a current time at which an error is detected in the first data, and wherein the current time corresponds to a time point at which the memory controller completes error correction code (ECC) detection on the first data; and send, based on the sequence information, the first data from a backup buffer to the memory controller.

2. The storage of claim 1, further comprising a read buffer configured to buffer data to be sent by the medium controller to the memory controller, wherein the medium controller is further configured to:

determine, based on the sequence information, location information of the first data in the backup buffer;

copy, based on the location information, the first data buffered in the backup buffer to the read buffer;

receive a second send command in the quantity of send commands from the memory controller; and send, in response to the second send command, the first data in the read buffer to the memory controller.

3. The storage of claim 1, further comprising the backup buffer, wherein the medium controller is further configured to buffer, in response to the first send command, the first data in the backup buffer when sending the first data to the memory controller.

4. The storage of claim 1, further comprising the backup buffer configured to buffer a plurality of pieces of data that have been sent by the medium controller to the memory controller.

5. The storage of claim 4, wherein the medium controller is further configured to back up, according to the send commands, the plurality of pieces of data into the backup buffer.

6. The storage of claim 5, wherein the medium controller is further configured to schedule, according to a first in, first out (FIFO) rule, the plurality of pieces of data in the backup buffer in an order of receiving the send commands.

7. A memory controller, comprising:

a memory configured to store instructions; and a processor coupled to the memory and configured to execute the instructions to:

send a first send command to a medium controller, wherein the first send command instructs the medium controller to send first data to the memory controller;

receive, in response to the first send command, the first data from the medium controller;

detect that an error has occurred in the first data;

determine a quantity of send commands that has been sent by the memory controller with a first time period from a first time point at which the first send command is sent to a current time at which the error is detected in the first data, wherein the current time corresponds to a time point at which the memory controller completes error correction code (ECC) detection on the first data, and wherein the memory controller determines the quantity of send commands by:

obtaining a value of a counter corresponding to the first send command; and determining, based on the value of the counter, the quantity of send commands; and send a data retransmission command comprising sequence information to the medium controller, wherein the sequence information comprises the quantity of send commands, and wherein the data retransmission command instructs the medium controller to resend, based on the sequence information, the first data to the memory controller.

8. The memory controller of claim 7, wherein a first latency is a second time period between a second time point at which a previous send command is sent and the first time point, wherein the previous send command is sent before the first send command, wherein the memory controller is further configured to send a second send command to the medium controller after a second latency when detecting that the error occurs in the first data, and wherein the second latency is greater than the first latency.

9. The memory controller of claim 8, wherein the memory controller is further configured to send the data retransmission command to the medium controller within the second latency, and wherein the second latency comprises a first time duration for transmitting the data retransmission command and a second time duration for the medium controller to execute the data retransmission command.

10. The memory controller of claim 7, wherein the memory controller is further configured to record the quantity of send commands that has been sent within the first time period.

11. An error recovery method for memory data, wherein the error recovery method is performed by a medium controller in a computer system comprising a memory controller and the medium controller, and wherein the error recovery method comprises:

receiving a first send command from the memory controller;

sending, in response to the first send command, first data to the memory controller;

receiving a data retransmission command from the memory controller, wherein the data retransmission command instructs the medium controller to resend the first data, wherein the data retransmission command comprises sequence information, wherein the sequence information indicates a quantity of send commands from the memory controller within a time period from a first time point at which the first send command is sent to a current time at which an error is detected in the first data, and wherein the current time corresponds to a time port at which the memory controller completes error correction code (ECC) detection on the first data; and sending, based on the sequence information, the first data from a backup buffer to the memory controller.

12. The error recovery method of claim 11, further comprising:

determining, based on the sequence information, location information of the first data in the backup buffer;

copying, based on the location information, the first data buffered in the backup buffer to a read buffer, wherein the read buffer is configured to buffer data to be sent by the medium controller to the memory controller;

receiving a second send command in the quantity of send commands sent by the memory controller; and sending, in response to the second send command, the first data in the read buffer to the memory controller.

13. The error recovery method of claim 11, further comprising backing up, in response to the first send command, the first data in the backup buffer when sending the first data to the memory controller.

14. The error recovery method of claim 11, further comprising:

buffering, in response to the send commands, a plurality of pieces of data that have been sent by the medium controller to the memory controller; and scheduling, according to a first in, first out (FIFO) rule, the plurality of pieces of data in the backup buffer in an order of receiving the send commands.

15. An error recovery method for memory data, wherein the error recovery method is performed by a memory controller in a computer system comprising the memory controller and a medium controller connected to the memory controller, and wherein the error recovery method comprises:

sending a first send command to the medium controller, wherein the first send command Instructs the medium controller to send first data to the memory controller;

receiving, in response to the first send command, the first data from the medium controller;

detecting that an error occurs m first data;

determining a quantity of send commands that has been sent by the memory controller within a time period from a first time point at which the first send command is sent to a current time at which the error is detected in the first data, wherein the current time corresponds to a time point at which the memory controller completes error correction code (ECC) detection on the first data and wherein the memory controller determines the quantity of send commands by:

obtaining a value of a counter corresponding to the first send command; and determining, based on the value of the counter, the quantity of send commands; and sending a data retransmission command comprising sequence information to the medium controller, wherein the sequence information comprises the quantity of send commands, and wherein the data retransmission command instructs the medium controller to resend, based on the sequence information, the first data to the memory controller.

16. The error recovery method of claim 15, wherein a first latency is a second time period between a second time point at which a previous send command is sent and the first time point, wherein the previous send command is sent before the first send command, wherein the error recovery method further comprises sending, by the memory controller, a second send command to the medium controller after a second latency when detecting that the error occurs in the first data, and wherein the second latency is greater than the first latency.

17. The error recovery method of claim 16, further comprising sending the data retransmission command to the medium controller within the second latency, wherein the second latency comprises a first time duration for transmitting the data retransmission command and a second time duration for the medium controller to execute the data retransmission command.

18. The error recovery method of claim 15, further comprising recording the quantity of send commands that has been sent within the time period.

* * * * *

UNITED STATES PATENT AND TRADEMARK OFFICE
CERTIFICATE OF CORRECTION

PATENT NO. : 11,784,756 B2
APPLICATION NO. : 16/893748
DATED : October 10, 2023
INVENTOR(S) : Shihai Xiao, Florian Longnos and Feng Yang Page 1 of 1

It is certified that error appears in the above-identified patent and that said Letters Patent is hereby corrected as shown below:

In the Claims

Claim 11, Column 22, Line 42: "a time port at" should read "a time point at"

Claim 15, Column 23, Line 11: "command Instructs the" should read "command instructs the"

Claim 15, Column 23, Line 15: "occurs m first" should read "occurs in first"

Claim 15, Column 23, Line 23: "data and wherein" should read "data, and wherein"

Signed and Sealed this
Fifth Day of December, 2023

Katherine Kelly Vidal
*Director of the United States Patent and Trademark Office*